(12) United States Patent
Massey et al.

(10) Patent No.: US 7,792,183 B2
(45) Date of Patent: Sep. 7, 2010

(54) DIGITAL QUALITY INDEX FOR QAM DIGITAL SIGNALS

(75) Inventors: Gregory W. Massey, Greenfield, IN (US); Reena Ramname, Fishers, IN (US); Kevin J. Oliver, Fishers, IN (US)

(73) Assignee: Acterna LLC, Germantown, MD (US)

( * ) Notice: Subject to any disclaimer, the term of this patent is extended or adjusted under 35 U.S.C. 154(b) by 531 days.

(21) Appl. No.: 11/856,921

(22) Filed: Sep. 18, 2007

(65) Prior Publication Data
US 2008/0089402 A1 Apr. 17, 2008

Related U.S. Application Data

(60) Provisional application No. 60/829,181, filed on Oct. 12, 2006.

(51) Int. Cl.
*H04B 3/46* (2006.01)

(52) U.S. Cl. ..................................... 375/227
(58) Field of Classification Search ......... 375/227–228, 375/257, 261, 377
See application file for complete search history.

(56) References Cited

U.S. PATENT DOCUMENTS

| 6,611,795 | B2 | 8/2003 | Cooper | 702/191 |
| 7,032,159 | B2 | 4/2006 | Lusky et al. | 714/774 |
| 2002/0044610 | A1* | 4/2002 | Jones | 375/261 |
| 2002/0160800 | A1* | 10/2002 | Rozmaryn | 455/522 |
| 2003/0179821 | A1 | 9/2003 | Lusky et al. | 375/224 |
| 2005/0144648 | A1 | 6/2005 | Gotwals et al. | 725/111 |
| 2005/0157804 | A1* | 7/2005 | Jones | 375/261 |
| 2005/0183130 | A1* | 8/2005 | Sadja et al. | 725/107 |
| 2005/0281200 | A1 | 12/2005 | Terreault | 370/241 |
| 2005/0286436 | A1 | 12/2005 | Flask | 370/252 |
| 2005/0286486 | A1 | 12/2005 | Miller | 370/351 |
| 2008/0256421 | A1* | 10/2008 | Gerstel et al. | 714/776 |
| 2009/0185037 | A1* | 7/2009 | Shi et al. | 348/184 |

FOREIGN PATENT DOCUMENTS

WO 2006/085275 8/2006

* cited by examiner

*Primary Examiner*—Khanh C Tran
(74) *Attorney, Agent, or Firm*—Matthew A. Pequignot; Pequignot + Myers LLC

(57) ABSTRACT

The present invention relates to a system for calculating a digital quality index (DQI), which provides a rating on a predetermined scale, indicative of the impairments in a received quadrature amplitude modulated (QAM) signal in a CATV cable system. The DQI system utilizes bit error rates prior to and after forward error correction to calculate the DQI value. To increase the calculation rate, the bit error rates can be estimated using voltage errors, signal to noise ratios and/or average corner error metrics.

25 Claims, 13 Drawing Sheets

Figure 6    Statistical Model for Approximating BER

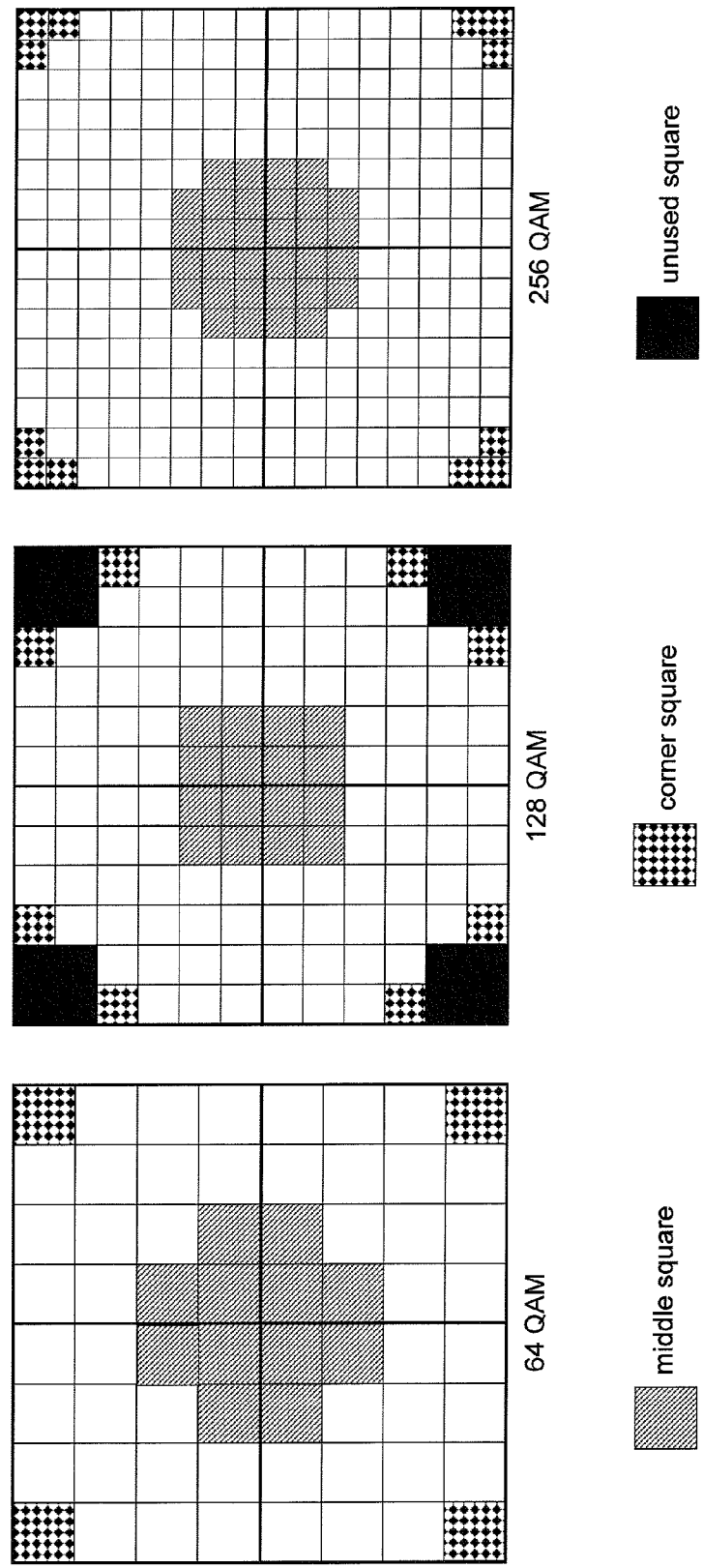

DIGITAL QUALITY INDEX FOR QAM DIGITAL SIGNALS

CROSS-REFERENCE TO RELATED APPLICATIONS

The present invention claims priority from U.S. Patent Application No. 60/829,181 filed Oct. 12, 2006 entitled "QAM DIGITAL QUALITY INDICATOR", which is incorporated herein by reference.

TECHNICAL FIELD

The present invention relates to a system for calculating a digital quality index (DQI), which is a measure of the impairments in a received quadrature amplitude modulated (QAM) digital signal in a CATV cable system, and in particular to a DQI system used to detect impairments and quantify the results over a predetermined range.

BACKGROUND OF THE INVENTION

Digitally modulated signals are used to transport high-speed data, video and voice on cable networks. The high-speed signals are subject to a variety of impairments that can seriously impact the quality and reliability of the services being provided. Unfortunately, measuring the signal level or looking at the display on a conventional spectrum analyzer isn't enough to fully troubleshoot problems or characterize the health of a digitally modulated signal.

Delivery of data services over cable television systems is typically compliant with a data-over-cable-service-interface-specifications (DOCSIS) standard. The content of the digital signal is typically modulated using quadrature amplitude modulation (QAM). Current cable QAM standards use conventional forward error correction (FEC) and interleaving techniques to transmit the data downstream. FEC is a system of error control for data transmission in which the receiving device detects and corrects fewer than a predetermined number or fraction of bits or symbols corrupted by transmission errors. FEC is accomplished by adding redundancy to the transmitted information using a predetermined algorithm. However, impairments that exceed the correction capability or the burst protection capacity of the interleaving will not be corrected, and the digital data will be corrupted. Accordingly, technicians need to be able to detect impairments above and below the threshold at which digital signals are corrupted to be able to detect current and potential problems.

As with all modulation schemes, QAM conveys data by changing some aspect of a carrier signal, or the carrier wave, which is usually a sinusoid, in response to a data signal. In the case of QAM, the amplitude of two waves, 90° out-of-phase with each other, i.e. in quadrature, are changed, e.g. modulated or keyed, to represent the data signal.

When transmitting two signals by modulating them with QAM, the transmitted signal will be of the form:

$$s(t) = I(t)\cos(2\pi f_0 t) + Q(t)\sin(2\pi f_0 t)$$

where I(t) and Q(t) are the modulating signals and $f_0$ is the carrier frequency.

At the receiver, the two modulating signals can be demodulated using a coherent demodulator, which multiplies the received signal separately with both a cosine and sine signal to produce the received estimates of I(t) and Q(t), respectively. Due to the orthogonality property of the carrier signals, it is possible to detect the modulating signals independently.

In the ideal case I(t) is demodulated by multiplying the transmitted signal with a cosine signal:

$$r_i(t) = s(t)\cos(2\pi f_0 t)$$
$$= I(t)\cos(2\pi f_0 t)\cos(2\pi f_0 t) + Q(t)\sin(2\pi f_0 t)\cos(2\pi f_0 t)$$

Using standard trigonometric identities:

$$r_i(t) = \frac{1}{2}I(t)[1 + \cos(4\pi f_0 t)] + \frac{1}{2}Q(t)\sin(4\pi f_0 t)$$
$$= \frac{1}{2}I(t) + \frac{1}{2}[I(t)\cos(4\pi f_0 t) + Q(t)\sin(4\pi f_0 t)]$$

Low-pass filtering $r_i(t)$ removes the high frequency terms, i.e. containing ($4\pi f_0 t$)), leaving only the I(t) term, unaffected by Q(t). Similarly, we may multiply s(t) by a sine wave and then low-pass filter to extract Q(t).

A constellation diagram is a representation of a signal modulated by a digital modulation scheme, such as quadrature amplitude modulation or phase-shift keying. The constellation diagram displays the signal as a two-dimensional scatter diagram in the complex plane at symbol sampling instants, i.e. the constellation diagram represents the possible symbols that may be selected by a given modulation scheme as points in the complex plane. Measured constellation diagrams can be used to recognize the type of interference and distortion in a signal.

By representing a transmitted symbol as a complex number and modulating a cosine and sine carrier signal with the real and imaginary parts, respectively, the symbol can be sent with two carriers, referred to as quadrature carriers, on the same frequency. A coherent detector is able to independently demodulate the two carriers. The principle of using two independently modulated carriers is the foundation of quadrature modulation.

As the symbols are represented as complex numbers, they can be visualized as points on the complex plane. The real and imaginary axes are often called the in phase, or I-axis and the quadrature, or Q-axis. Plotting several symbols in a scatter diagram produces the constellation diagram. The points on a constellation diagram are called constellation points, which are a set of modulation symbols that comprise the modulation alphabet.

In QAM, the constellation points are usually arranged in a square grid with equal vertical and horizontal spacing, although other configurations are possible. The most common forms are 16-QAM, 64-QAM, 128-QAM and 256-QAM. By moving to a higher-order constellation, it is possible to transmit more bits per symbol; however, if the mean energy of the constellation remains the same, in order to make a fair comparison, the points must be closer together and are thus more susceptible to noise and other corruption, i.e. a higher bit error rate. Accordingly, a higher-order QAM will deliver more data less reliably than a lower-order QAM. 64-QAM and 256-QAM are often used in digital cable television and cable modem applications. In the United States, 64-QAM and 256-QAM are the mandated modulation schemes for digital cable as standardised by the SCTE in the standard ANSI/SCTE 07 2000.

A typical QAM analyzer design includes a user interface, e.g. a keypad and a display, and possibly an Ethernet or other external connection for connection to a personal computer. A tuner is used to select a digitally modulated signal of interest, and a QAM demodulator provides several elements indicative of the received signal, such as carrier frequency acquisition, carrier phase tracking, symbol rate tracking, adaptive equalizer, and J.83 channel decoding. By probing into the elements of the QAM demodulator one can retrieve information on MER, pre- and post-FEC BER, and channel response, which is part of physical layer testing.

To troubleshoot a subscriber's premises with a signal problem, a technician will travel to the premises or a hub nearby, and conduct a variety of tests on the digitally modulated signal, e.g. RF level, MER, pre- and post-FEC BER, and an evaluation of the constellation for impairments. In addition, the technician may look at the equalizer graph for evidence of micro-reflections, and check in-channel frequency response and group delay. Moreover, if the QAM analyzer is able, the measurements are repeated in the upstream direction. Unfortunately, all of the test results require a certain degree of experience, knowledge and skill to interpret, potentially resulting in differing explanations for the problem depending on the technician. BER measurements require that the test instrument have the capability to fully decode the digital signal, and require long sampling time to detect low bit error rates. Furthermore, post-FEC BER shows only the impairments the exceed the correction capability of the FEC and interleaving United States Patent Applications Nos. 2005/0144648 published Jun. 30, 2005 in the name of Gotwals et al; 2005/0281200 published Dec. 22, 2005 to Terreault; 2005/0286436 published Dec. 29, 2005 to Flask; and 2005/0286486 published Dec. 29, 2005 to Miller disclose conventional cable signal testing devices. U.S. Pat. Nos. 6,611,795 issued Aug. 26, 2003 to Cooper, and 7,032,159 issued Apr. 18, 2006 to Lusky et al, and United States Patent Application No. 2003/0179821 published Sep. 25, 2003 to Lusky et al relate to error correcting methods. PCT Patent Publication No. WO 2006/085275 published Aug. 17, 2006 to Moulsley et al relates to estimating the BER based on the sampled amplitude of the signal.

An object of the present invention is to overcome the shortcomings of the prior art by providing a fast and sensitive measurement of impairments on a QAM digital channel without requiring full decode capability of the QAM signal, and without requiring a vast amount of expertise.

SUMMARY OF THE INVENTION

Accordingly, the present invention relates to a method of determining an indication of the quality on a QAM digital signal on a cable network with forward error correction comprising the steps of:

a) determining a first bit error rate (BER) of the digital signal prior to forward error correction (FEC);

b) determining a second bit error rate after forward error correction (FEC);

c) determining a digital quality index (DQI) on a predetermined scale based on the first and second bit error rates; and d) displaying the DQI to provide an indication of the quality of the QAM digital signal on the cable network.

Another embodiment of the present invention relates to a testing device for generating an indication of the quality on a QAM digital signal on a cable network with forward error correction (FEC) comprising:

an input port for receiving the QAM digital signal;

first bit error rate (BER) generating means for determining the BER of the QAM digital signal prior to FEC;

second first bit error rate (BER) generating means for determining the BER of the QAM digital signal after FEC;

digital quality index generating means for determining a digital quality index (DQI) of the QAM digital signal on a predetermined scale based on the first and second BER; and a display for displaying the DQI to provide an indication of the quality of the QAM digital signal on the cable network.

Another embodiment of the present invention relates to a method of determining a bit error rate of a QAM digital signal on a cable network with forward error correction (FEC) comprising the steps of:

a) determining an error voltage $V_{ERR}$ of the digital signal once every 10 to 50 microseconds;

b) determining a first bit error rate prior to FEC based on a predetermined statistical relationship between the $V_{ERR}$ and the first BER once every 10 to 50 microseconds; and c) averaging the first BER every 0.5 to 2 seconds.

BRIEF DESCRIPTION OF THE DRAWINGS

The invention will be described in greater detail with reference to the accompanying drawings which represent preferred embodiments thereof, wherein:

FIG. 8 are constellation diagrams for 64, 128 and 256 QAM signals illustrating the corner and middle squares;

DETAILED DESCRIPTION

Figure 1:
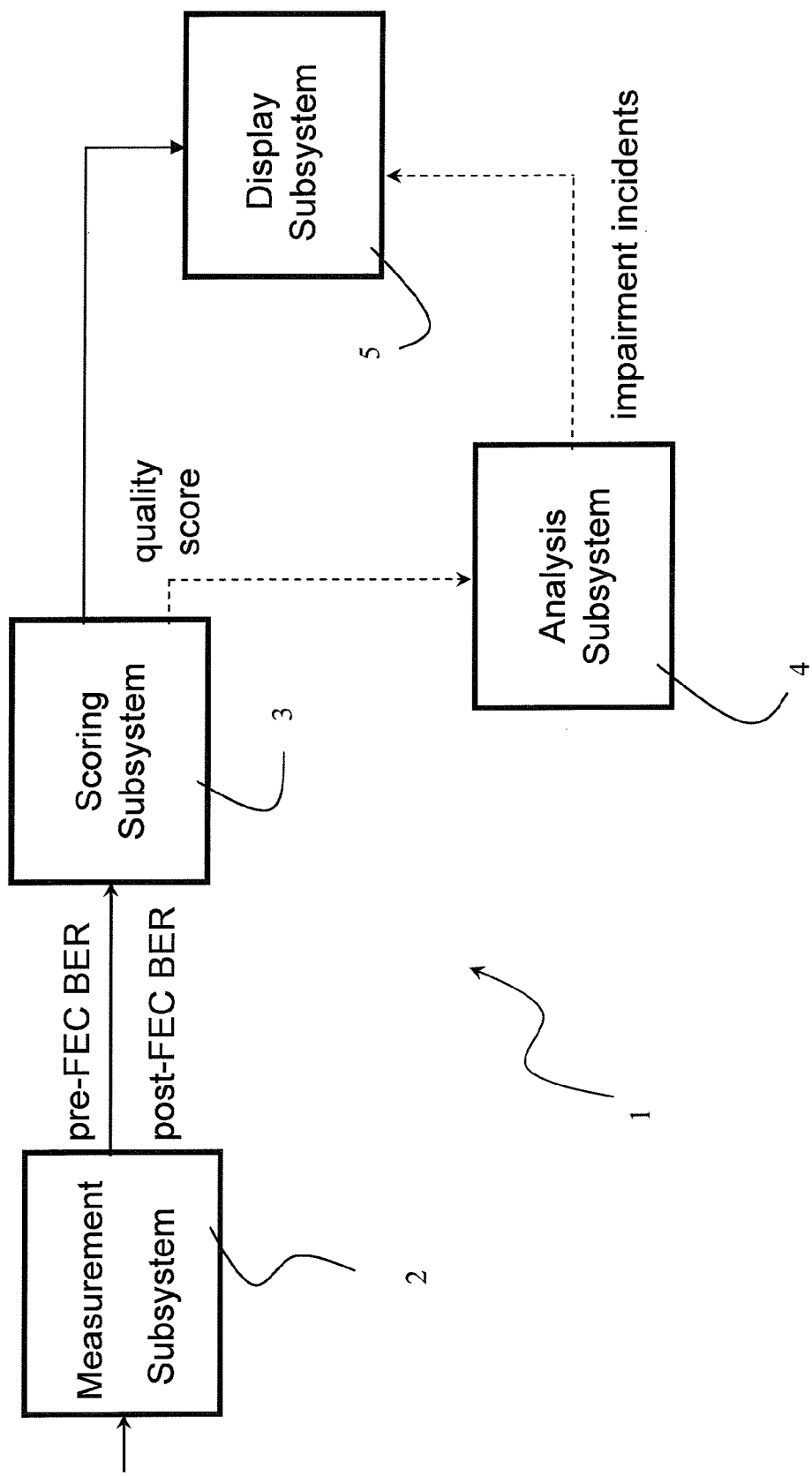
FIG. 1 is a schematic representation of the testing device of the present invention.

With reference to FIG. 1, the DQI testing device 1 of the present invention includes four subsystems: a receiver and measurement subsystem 2 for receiving a quadrature amplitude modulated (QAM) signal and for determining bit error rates prior to and after forward error correction, a scoring subsystem 3 for generating a digital quality index (DQI) number on a predetermined scale, e.g. 0 to 10, based on the aforementioned bit error rates, an analysis subsystem 4 for analyzing the determined information, and a display subsystem 5 for relating the DQI number and any addition information to the technician utilizing the testing device 1.

Figure 2:
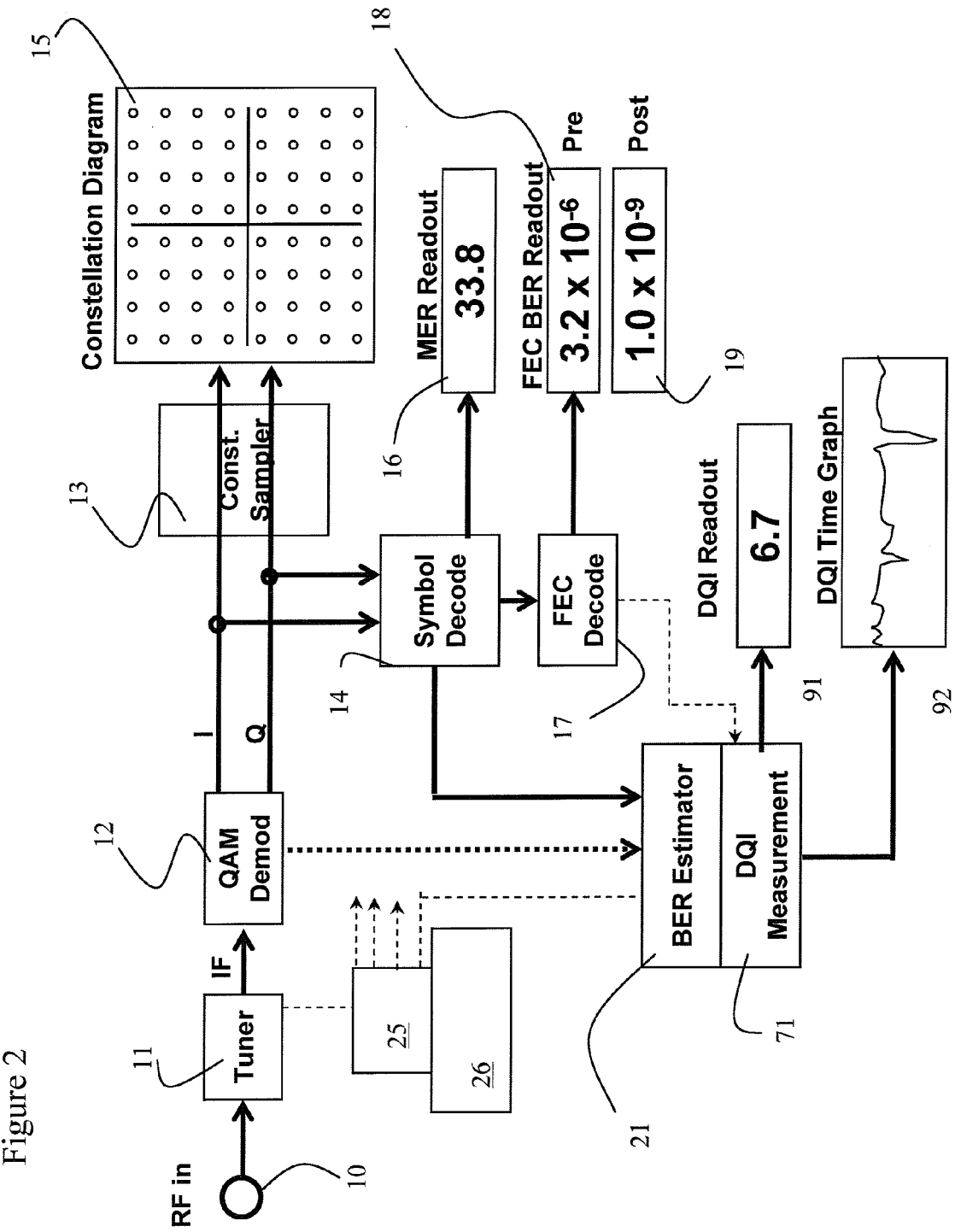
FIG. 2 is a schematic representation of the subsystems of the testing device of the present invention.

With reference to FIG. 2, the receiver and measurement subsystem 2 includes an input port 10 for receiving the QAM digital signal from a cable network, a tuner 11 for selecting a desired cable channel to test, and a QAM demodulator 12 for demodulating the QAM signal into I and Q signals. In a full service testing device, the I and Q signals are transmitted to a constellation sampler 13 and a symbol decoder 14, which decodes the digital signal into a decoded signal. The constellation sampler 13 generates a constellation diagram 15. The symbol decoder 14 determines the modulation error ratio (MER) for display at readout 16, and transmits the decoded signal to a forward error correction (FEC) decoder 17. The FEC decoder 17 performs error correction on the decoded signal, and determines a bit error rate (BER) before and after the error correction for display at readouts 18 and 19, respectively.

The QAM demodulator 12 also provides a QAM decode error voltage ($V_{ERR}$), which can be used to compute the Modulation Error Rate (MER), an estimate of the signal to noise ratio (SNR) of the digital signal, to a bit error rate (BER) calculator 21 to convert the $V_{ERR}$ to a bit error rate (BER). The $V_{ERR}$ value from the QAM demodulator 12 is multiplied by different scale factors depending on the QAM modulation of the signal, for example:

| Scale Factors | Annex A | Annex B |
|---|---|---|
| 64 QAM | 0.67 | 0.50 |
| 128 QAM | 1.34 | N/A |
| 256 QAM | 1.32 | 1.00 |

MER(dB)=20 $\log_{10}$ ($V_{REF}/V_{ERR}$)

EVM(dB)=20 $\log(V_{ERR}/V_{REF})$, or EVM(%)=($V_{ERR}/V_{REF}$)*100%

The reference voltage $V_{REF}$ is the RMS voltage of an ideal signal.

MER is commonly used in digital communications as an approximation of SNR or as a substitute for it. A true SNR measurement is difficult to perform on a digital signal. Accordingly, the term SNR analyzer is used for the subsystem that uses the filtered error voltages to get pre- and post-FEC BER estimates.

Figure 3:
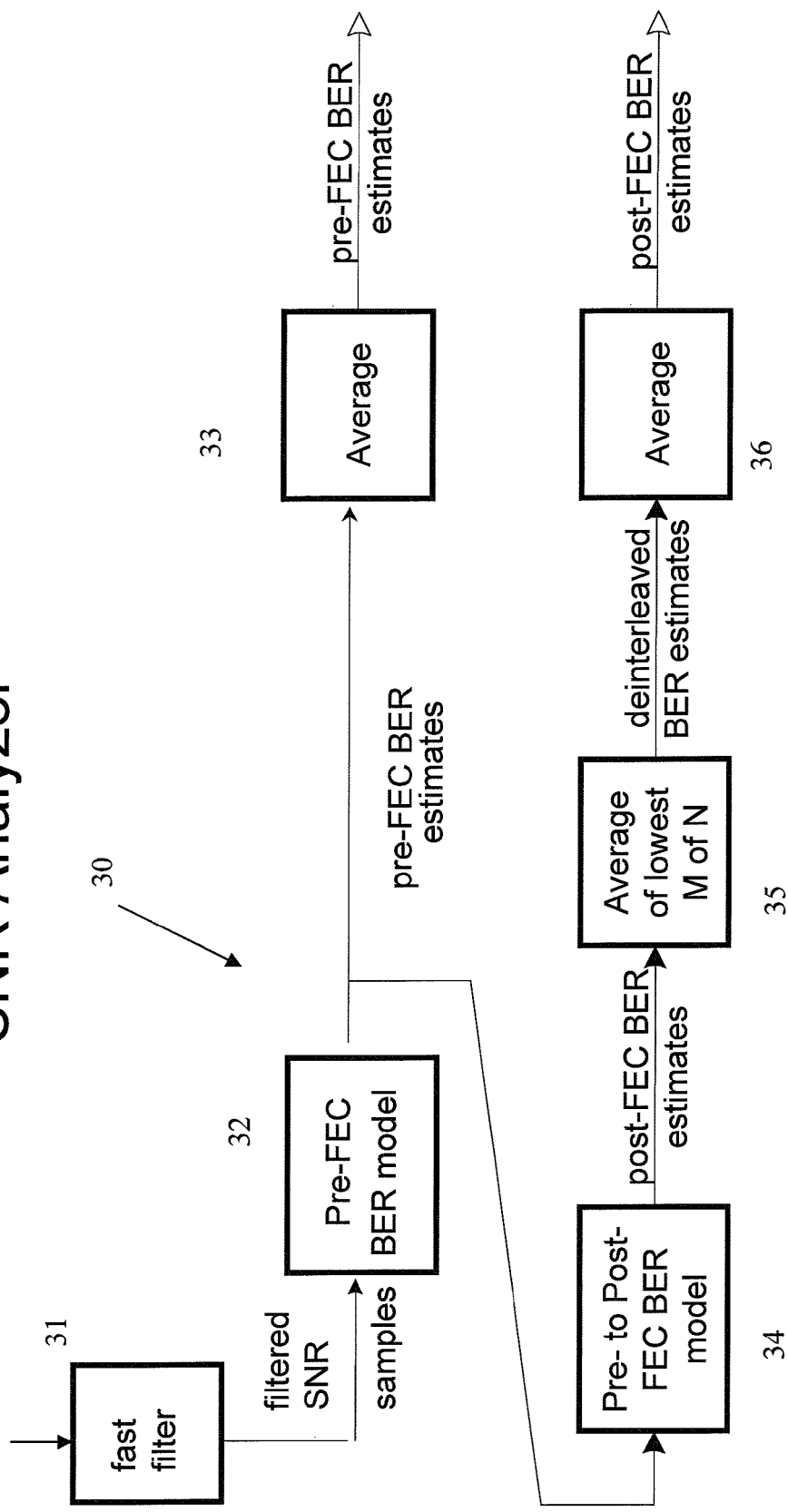
FIG. 3 is a schematic representation of a statistical model for approximating bit error rate prior to and after forward error correcting.

The scoring subsystem 3 can use the pre-FEC BER and the post-FEC BER determined from the FEC decoder 17, as shown by the which will necessitate that the digital signal be fully decoded, and a great deal of time to measure low BERs. Alternatively, the constellation sampler 13, the symbol decoder 14, the constellation diagram 15, the MER readout 16, and the FEC decoder 17 can be eliminated, and the BER calculator 21 can be used to estimate the pre-FEC BER and the post-FEC BER. The BER calculator 21 includes an SNR analyzer 30, illustrated in FIG. 3 or, in a preferred embodiment, a combination of the SNR analyzer 30 with an I-Q corner analyzer 41, as in FIG. 6. All of the aforementioned systems are under the control of a microcomputer 25 with a keyboard or graphical interface 26.

The SNR analyzer 30 receives filtered $V_{ERR}$ samples, e.g. from a fast filter 31, which is sampled once every 10 to 50 microseconds, and a pre-FEC BER prior to the forward error correction (FEC) is calculated at 32 in accordance with a predetermined statistical relationship between $V_{ERR}$ and pre-FEC BER. The average pre-FEC BER is determined at 33, and forwarded to the scoring subsystem 3 or combined with the pre-FEC BER provided by the I-Q corner analyzer 41, as hereinafter described. In order for the present invention to see narrow ingress pulses, the estimated $V_{ERR}$ must be sampled at a higher rate than would normally be used to measure MER. Hardware filtering, i.e. fast filter 31, is needed if the sample rate is lower than the QAM symbol rate, but the time constant of the filter 31 must be appropriate for the fast sample rate required.

Figure 4:
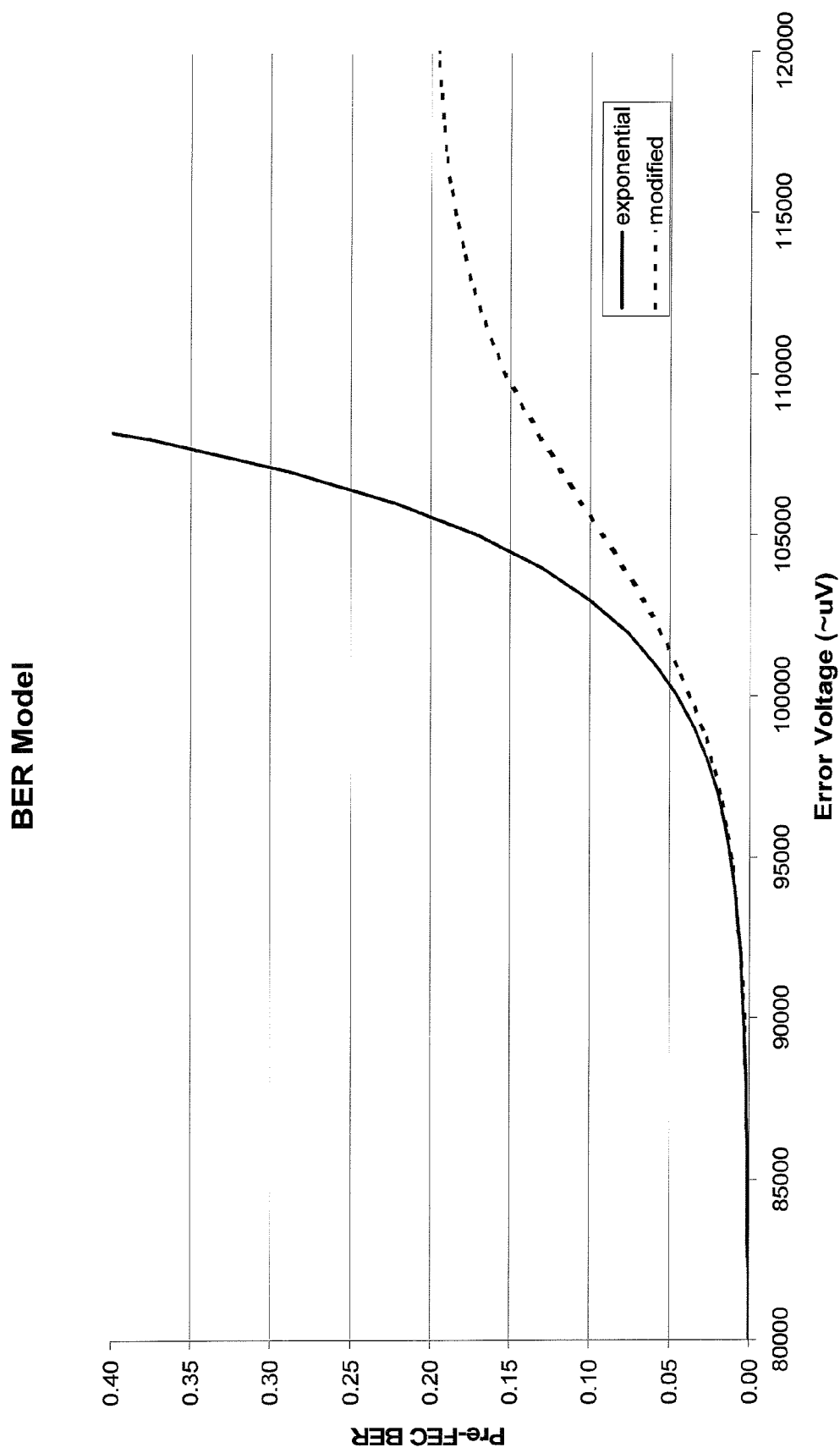
FIG. 4 is a plot of BER prior to FEC vs Error Voltage ($V_{ERR}$) for the statistical model of FIG. 3.

Simulations and mathematical modeling were conducted to determine a mathematical relationship between SNR (or $V_{ERR}$) to pre-FEC BER. An exponential function provides a good approximation of the relationship between the $V_{ERR}$ and the pre-FEC BER; however, fails when high $V_{ERR}$ values cause the pre-FEC BER to go over 1, as seen in FIG. 4. Accordingly, in a first embodiment the pre-FEC estimated BER f is computed from the scaled $V_{ERR}$ value x using a modified exponential equation:

$$f(x) = \frac{c}{1 + ae^{-bx}}$$

with a>0, b>0 and 0≦c≦1, and preferably wherein a=1.42857×10$^{12}$, b=2.65×10$^{-4}$, and c=0.2, which is graphically illustrated in FIG. 4. The values of the constants a, b, and c are selected based on the specific QAM decoder hardware by analyzing data sampled with know signal impairments.

Figure 5:
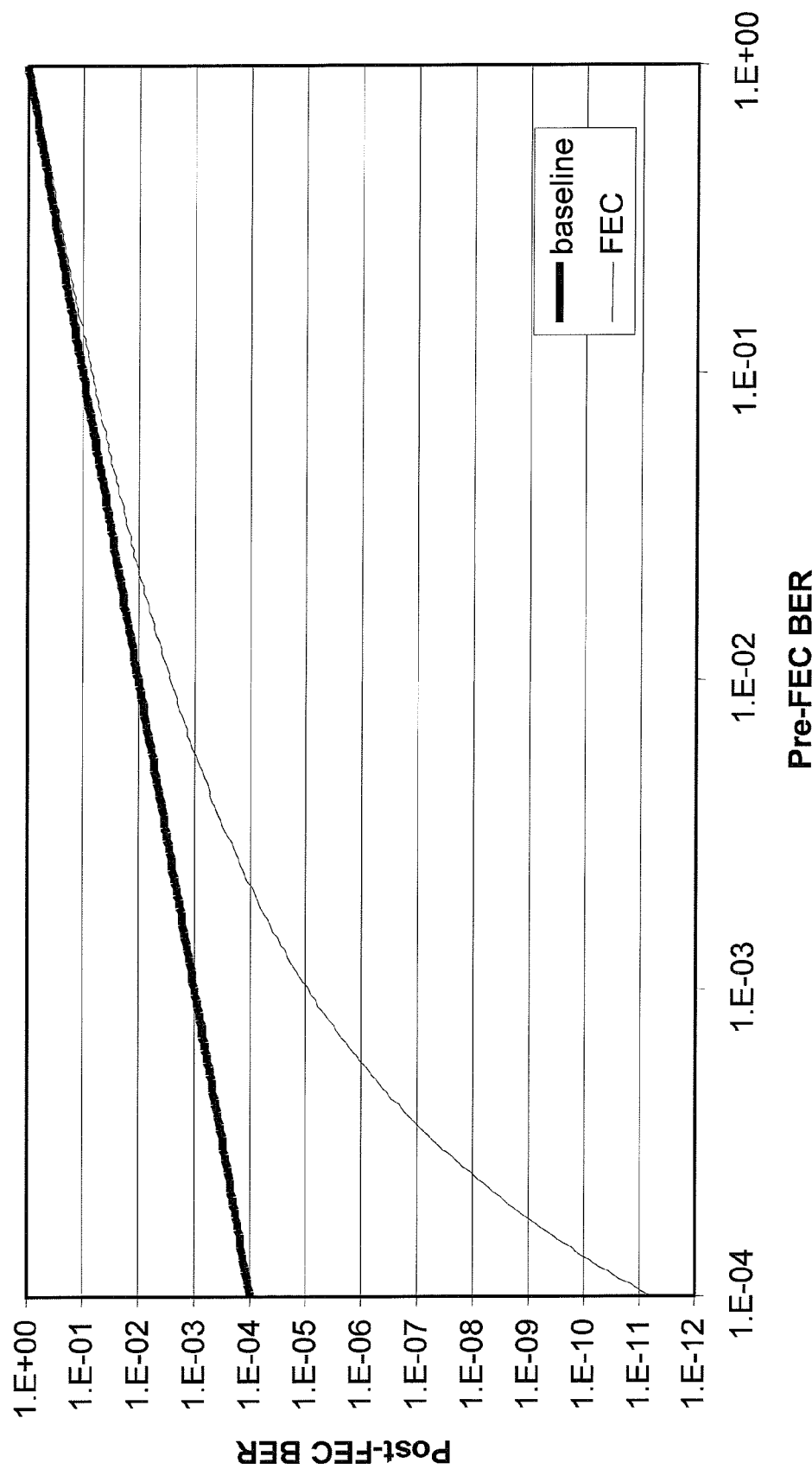
FIG. 5 is a plot of BER prior to FEC vs BER after FEC for the statistical model of FIG. 3.

Subsequently, the post-FEC estimated BER g is calculated at 34 in accordance with a predetermined statistical relationship between pre-FEC BER and post-FEC BER. Additional simulations and mathematical modeling were conducted to determine a mathematical relationship between pre-FEC BER and post-FEC BER. In a preferred embodiment, the post-FEC estimated BER x is determined using the equation:

$$g(x)=xe^{-p/x^q}$$

with p and q>0, and wherein p 0.105277 and q 0.55, which is graphically illustrated in FIG. 5. Again, the values of the constants p and q are selected based on the specific QAM decoder hardware by analyzing data sampled with know signal impairments.

The lowest M of N post-FEC BER estimates are averaged at 35, and deinterleaved post-FEC BER estimates are averaged at 36. The average post-FEC BER is forwarded to the scoring subsystem 3 or combined with the post-FEC BER provided by the I-Q corner analyzer 41, as hereinafter described.

FEC divides the data stream into fixed-length blocks and adds redundant data to each block in order to correct a small number of errors occurring in the transmission of the block. A noise burst often corrupts more consecutive QAM symbols than can be corrected in a single block. In order to protect the data from corruption by long noise bursts, the sender interleaves data from several blocks prior to transmitting the data. The receiver deinterleaves the data to restore the original order within the FEC blocks. Interleaving increases the burst protection capacity by multiplying the number of correctable symbols of one FEC block by the number of blocks being interleaved. The burst correction time can be computed from the symbol rate and the number of consecutive symbols that can be corrected. Interleaving does not increase the overall ratio of correctable symbols to total symbols contained within a block. As a result, interleaving to correct longer noise bursts requires that the minimum time between noise bursts also be increased. The minimum time between noise bursts is called the interleaver latency time, and can be computed from the symbol rate and the total length of all FEC blocks being interleaved. The symbols may be the same, but often the FEC symbol is 7 bits long and the QAM symbol is 6 or 8 bits long. The data is grouped into FEC symbols, then interleaved, then regrouped into QAM symbols.

The post-FEC BER model simulates the effects of interleaving by keeping a rolling history of the values from the pre to post-FEC BER block 34. Whenever block 35 receives a new value, the oldest value is discarded. During an initialization phase of the averaging step 35 of the SNR analyzer 30, values are merely accumulated; however, once N values are received, a new value is output for each new value input. The output values consist of the average of the lowest M values of the N values stored in the rolling history. Accordingly, the burst protection effects of interleaving are approximated, when used in conjunction with FEC. The values M and N are selected to approximate the burst correction capacity and latency times of the interleaver being used. M is the sample burst correction time divided by the sample period, and N is the interleaver latency time divided by the sample period.

Averaging step, illustrated by blocks 33 and 36 are conducted at a very high speed, e.g. once every 5 to 50 (or 10 to 25) microseconds, over a longer measurement interval, e.g. 0.5 to 2 seconds or more, ideally 1 second. Accordingly, overall average post and pre-FEC BER values are obtained by averaging the BER values for additive white Gaussian noise (AWGN), which provides a fairly accurate approximation for real-world impairments, especially impulse noise.

Figure 6:
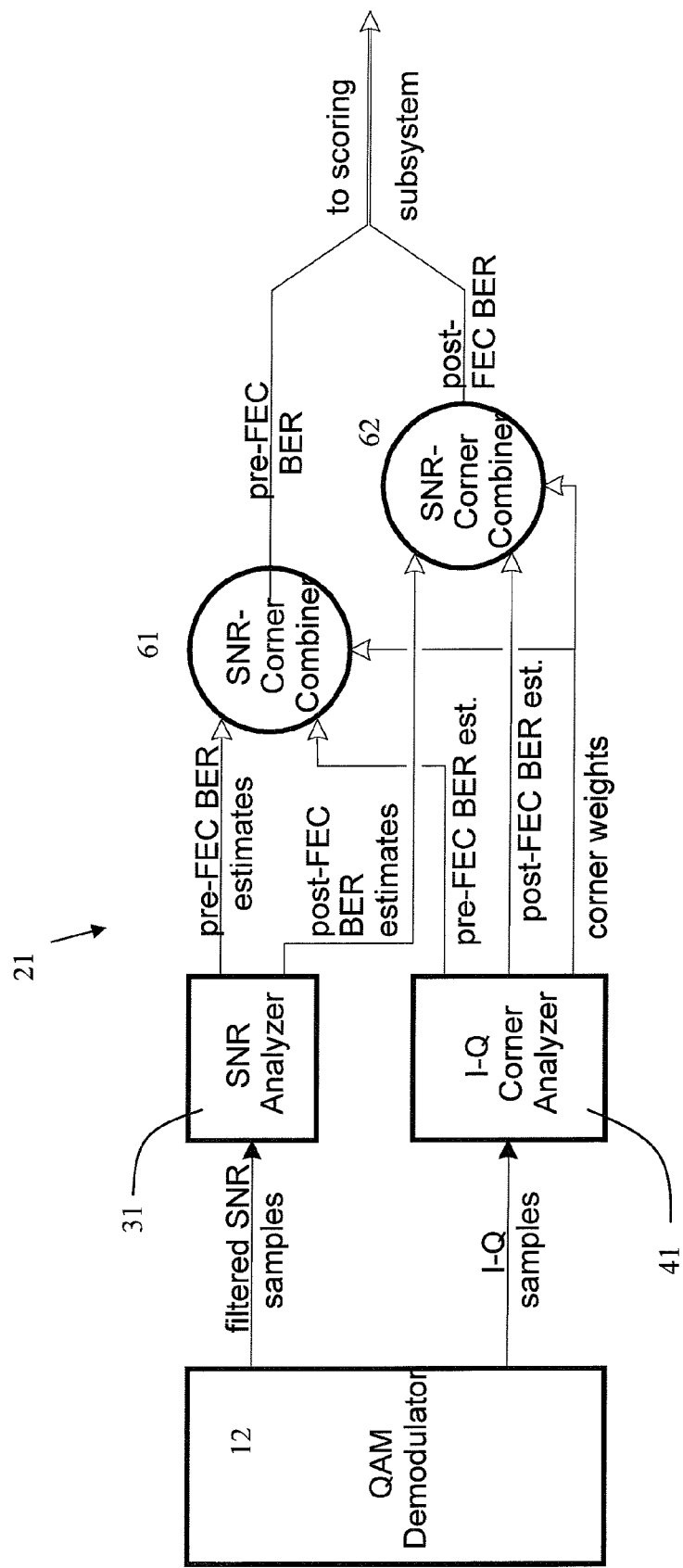
FIG. 6 is a schematic representation of an alternate embodiment of a statistical model for approximating bit error rate prior to and after forward error correcting.
Figure 7:
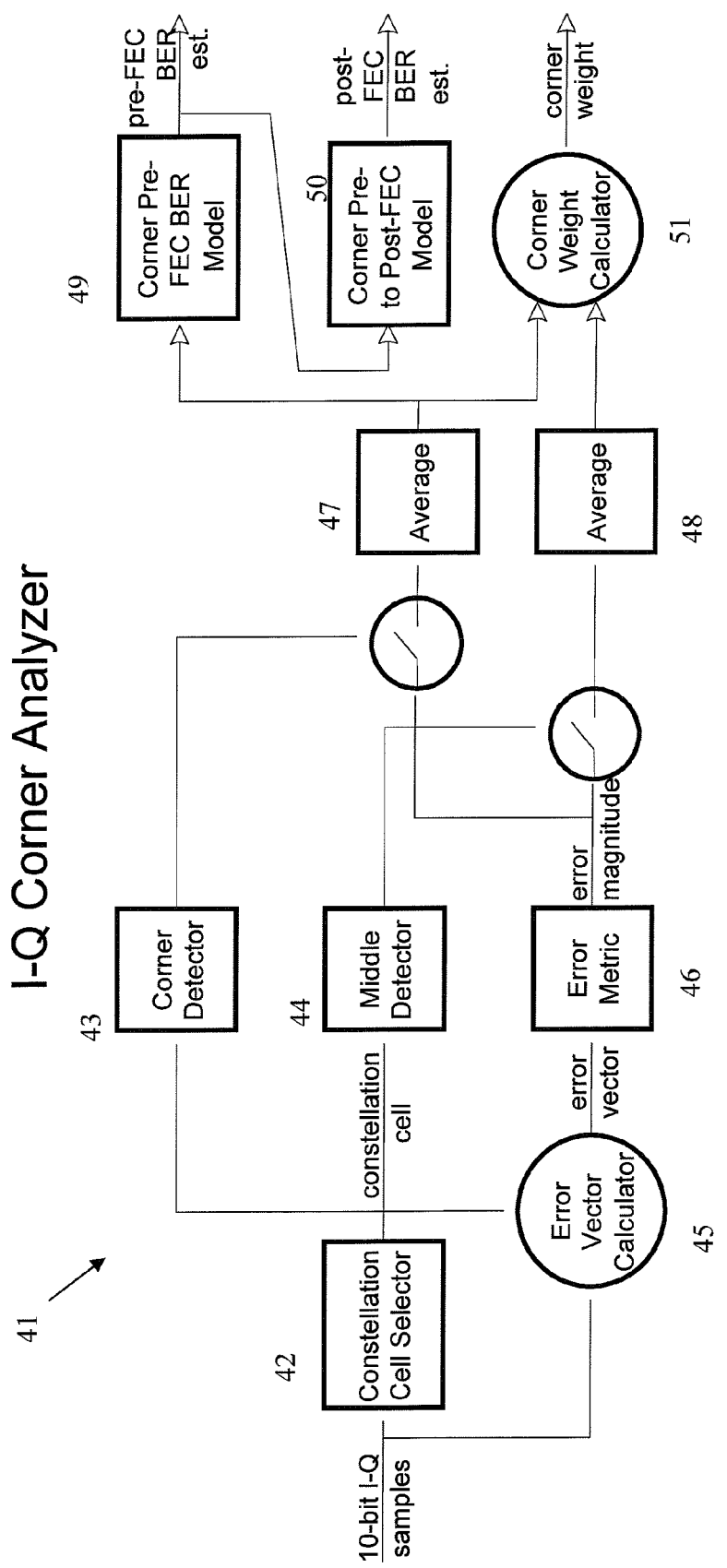
FIG. 7 is a schematic representation of a I-Q corner analyzer of the statistical model of FIG. 6.

With reference to FIGS. 6 and 7, the BER calculator 21 preferably includes an I-Q corner analyzer 41 providing an additional means to determine the pre-FEC and the post-FEC BER values, which are combined with the aforementioned means based on the $V_{ERR}$ to obtain more accurate pre-FEC and post-FEC BER values.

A constellation cell selector 42 of the I-Q Corner Analyzer 41 receives 10 bit I and Q signal samples once every 5 to 50 (or 10 to 25) microseconds (ideally faster dependent on sampling hardware) from the QAM demodulator 12 via signal decoder 14, identifies the grid square to which each sample belongs, and then transmits the grid square to the corner detector 43, and to the middle detector 44, which identify the samples that belong to the corner and middle regions, respectively. Examples of corner and middle squares in 64, 128 and 256 QAM constellation diagrams are illustrated in FIG. 8. The middle squares comprise the 10% to 20% of the squares closest to the middle of the constellation diagram, as measured using the Euclidean distance from the center of the square to the middle of the constellation diagram i.e. 2 to 3 squares in each direction from the center, while the corner squares are the 4% to 8% of the squares farthest from the middle of the constellation diagram, e.g. the extreme corner squares of the constellation diagram and/or those squares adjacent thereto.

An error vector is calculated utilizing the 10 bit I and Q signal samples from the QAM demodulator 12 by an error vector calculator 45. An error metric is determined at 46 utilizing horizontal and vertical components of the error vector, according to the equation:

$$E = x^4 + y^4$$

where E is the error magnitude and x and y are the horizontal and vertical components of the error vector. The error metric is computed for all grid squares in the corner and middle regions of the constellation diagram 15, as illustrated in FIG. 8. Separate averages of the error metric are computed for the corner region and the middle region at 47 and 48, respectively, utilizing the error metric, every 0.5 to 2 seconds, i.e. every time a new DQI value is calculated. After averaging at 47 and 48, the average value is divided by a scale factor based on the modulation, e.g. 16 for 256 QAM, 81 for 128 QAM, and 256 for 64 QAM, to normalize the error magnitude. The aforementioned scale factors assume that I and Q have 10-bit resolution, which is a hardware dependency.

A pre-FEC BER prior to the forward error correction (FEC) is determined at 49 in accordance with a predetermined statistical relationship between the corner average error metric and pre-FEC BER. In a preferred embodiment, the corner pre-FEC BER model is a simple power function:

$$p(x) = ax^b$$

where x is the corner average error metric, p is the pre-FEC BER estimate, a=2.92567E-19, and b=3.14057. The values of the constants a and b are selected based on the specific QAM decoder hardware by analyzing data sampled with know signal impairments.

A post-FEC BER prior to the forward error correction (FEC) is determined at 50 in accordance with a predetermined statistical relationship between the pre-FEC BER and the post-FEC BER. Preferably, the pre- to post-FEC BER model is given by the equation $$q(p) = pe^{\frac{k}{mp^r}}$$

where p is the pre-FEC BER estimate, q is the post-FEC BER estimate, k=-0.105277, m=12.5893, and r=0.55. The values of the constants p, q, m and k are selected based on the specific QAM decoder hardware by analyzing data sampled with know signal impairments.

A corner weight calculator 51 calculates a corner weight, which is preferably given by the equations $$r = \sqrt{\max\left\{1, \frac{c}{(m+k_m)k_c}\right\}}$$

$$w = w_{\max}\left(1 - \frac{1}{r}\right)$$

where w is the corner weight, c is the corner average error metric, and m is the middle average error metric. The constants include maximum corner weight $w_{max}=0.1$, middle offset $k_m=2100$, and corner threshold $k_c=1.75$.

With reference to FIG. 6, the BER estimates from the combined SNR (or $V_{ERR}$) and corner models for the pre-BER estimates are computed in the SNR-corner combiner 61 using the equation:

$$p(s,c,w) = \max\{s, cw + s(1-w)\}$$

where s is the SNR model BER, c is the corner model BER, and w is the corner weight. Similarly, the BER estimates from the combined SNR and corner models for the post-BER estimates are computed in the SNR-corner combiner 62 using the same equation.

The scoring subsystem 3 receives the pre-FEC BER and the post-FEC BER estimates from the BER calculator 21, and provides them to a DQI logic measurement system 71 to determine the DQI on a predetermined scale, e.g. 1 to 5 or 0 to 10. Exemplary algorithms for the logic measurement system 71 are illustrated in FIGS. 9a and 9b.

Figure 9A:
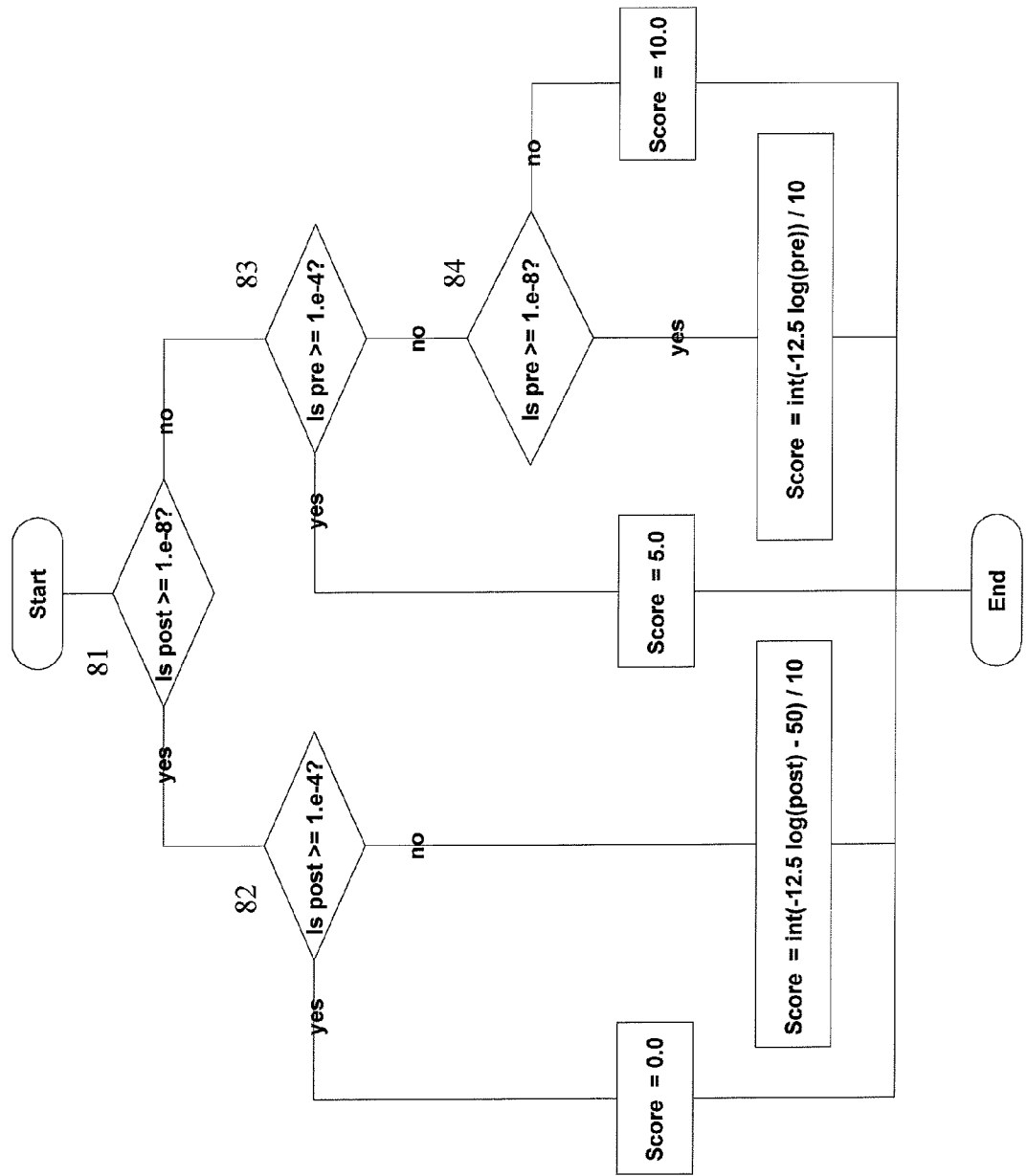
FIG. 9a is a flow chart for determining the DQI in accordance with BER prior to and after FEC.
Figure 9B:
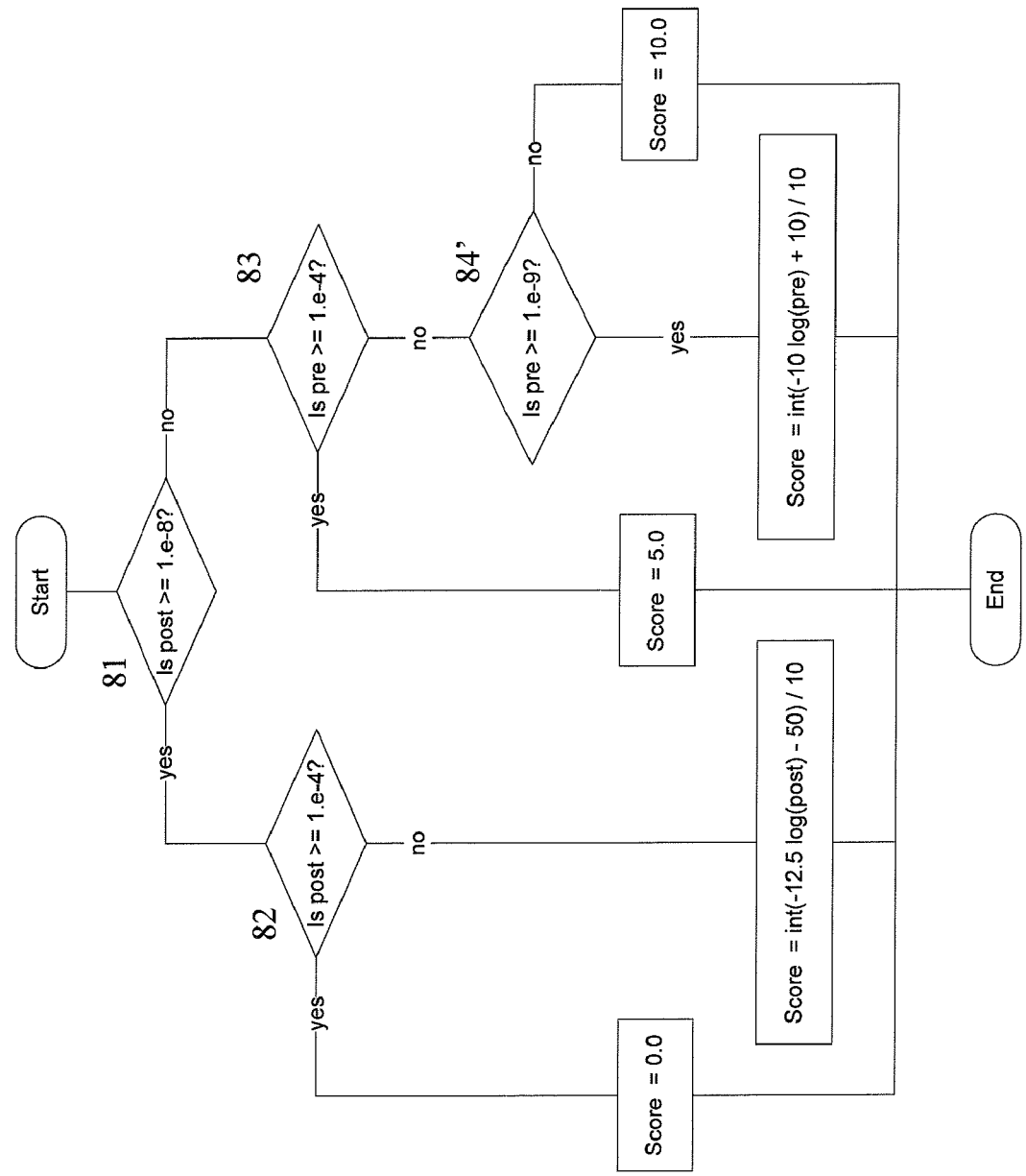
FIG. 9b is an alternative flow chart for determining the DQI in accordance with BER prior to and after FEC.

With reference to FIG. 9a, an initial logic box 81 determines whether the post-FEC BER is equal to or greater than a post minimum threshold, e.g. $1 \times e^{-8}$. If so, then a second logic box 82 determines whether the post-FEC BER is equal to or greater than a post maximum threshold, e.g. $1 \times e^{-4}$. If so, then the DQI score is determined to be the lowest rating, e.g. zero, on a predetermined scale, e.g. zero to ten. If not, i.e. the post-FEC BER is between the post minimum and the post maximum thresholds, then the DQI score varies, e.g. logarithmically, between the lowest rating, e.g. 0 and a middle rating, e.g. 5, and can determined by the equation:

$$DQI=int(-12.5 \log(\text{post-FEC BER})-50)/10$$

If the post-FEC BER is not equal to or greater than, i.e. is less than, the post minimum threshold, e.g. $1 \times e^{-8}$, then a third logic box 83 determines whether pre-FEC BER is equal to or greater than an prior maximum threshold, e.g. $1 \times e^{-4}$. If so, i.e. the post-FEC BER is less than the post minimum threshold, but the pre-FEC BER is greater than the prior maximum threshold, then the DQI score is the middle rating on the predetermined scale, e.g. 5.0. If not, then a fourth logic box 84 determines whether the pre-FEC BER is equal to or greater than an prior minimum threshold, e.g. $1 \times e^{-8}$. If not, i.e. the pre-FEC BER is less than the prior minimum threshold and the post-FEC BER is less than the post minimum threshold, then the DQI score is a highest rating on the predetermined scale, e.g. 10.0, but if so, i.e. the post-FEC BER is less than the post minimum threshold, but the pre-FEC BER is between the prior minimum and prior maximum thresholds, then the DQI score varies, e.g. logarithmically, between the middle rating, e.g. 5 and the highest rating, e.g. 10, and is determined by the equation:

$$DQI=int(-12.5 \log(\text{pre-FEC BER}))/10$$

In an alternate embodiment illustrated in FIG. 9b, the fourth logic box 84 is replaced by a modified fourth logic box 84', which determines whether the pre-FEC BER is equal to or greater than a different prior minimum threshold, $1 \times e^{-9}$. Moreover, if the post-FEC BER is less than the post minimum threshold, but the pre-FEC BER is between the post minimum and post maximum thresholds, then the DQI score varies, i.e. logarithmically, between the middle and highest ratings, e.g. 5 and 10, and is determined by the equation:

$$DQI=int(-10 \log(\text{pre-FEC BER})+10)/10$$

Figure 10:
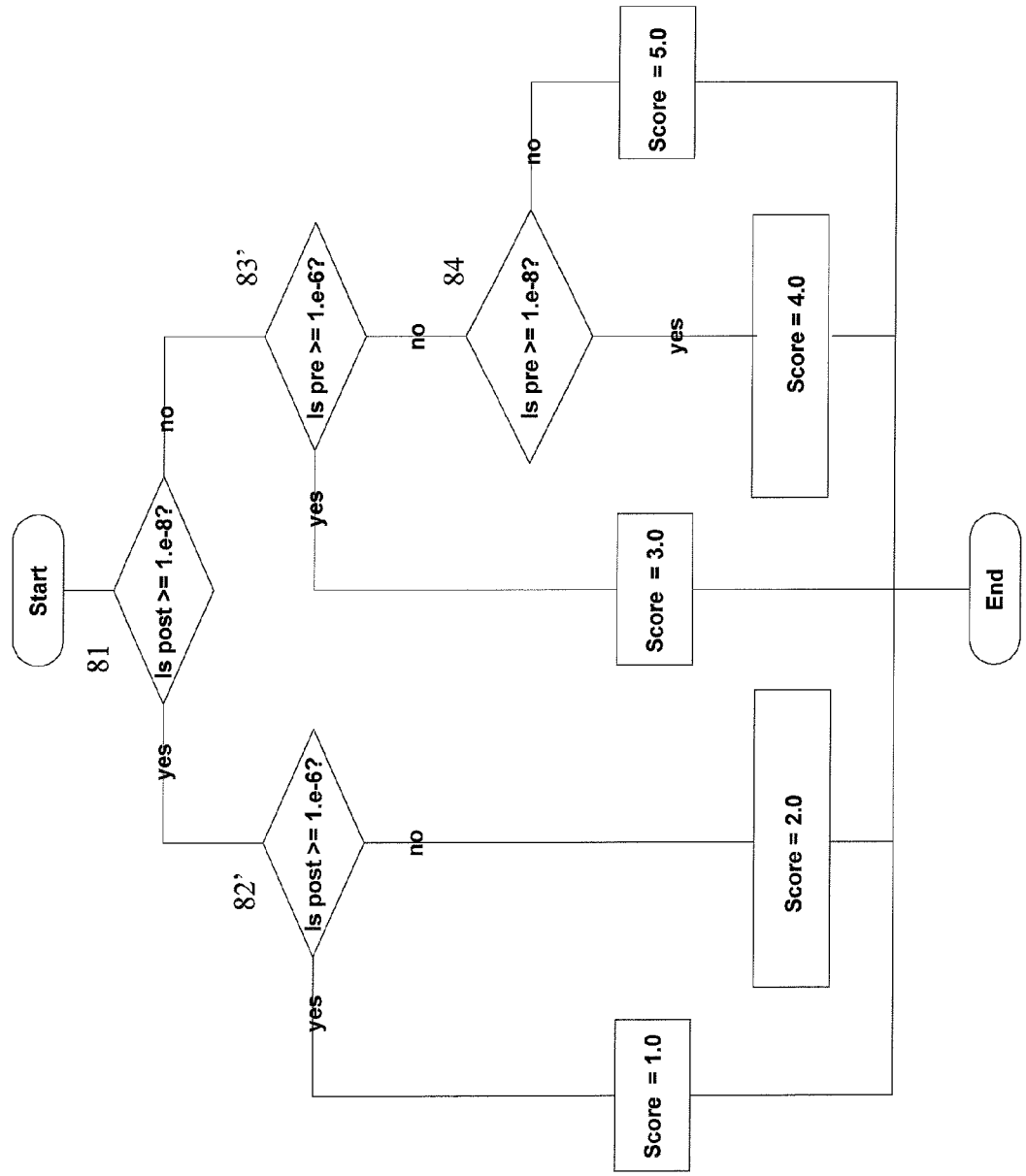
FIG. 10 is an alternative flow chart for determining the DQI in accordance with BER prior to and after FEC.

In a simplified embodiment, illustrated in FIG. 10, the first logic box 81 is the same as above, but the second logic box 82 is replaced by a modified second logic box 82', which determines whether the post-FEC BER is also equal to or greater than a revised post maximum threshold, e.g. $1 \times e^{-6}$. If so, then the DQI score is the lowest rating, i.e. 1, if not, i.e. the post-FEC BER is between the post minimum and maximum thresholds, then the DQI score is between the lowest and middle ratings, i.e. 2. The third logic box 83 is also replaced by a modified third logic box 83', which determines whether the pre-FEC BER is equal to or greater than a revised prior maximum threshold, e.g. $1 \times e^{-6}$. If so, i.e. the post-FEC BER is less than the post minimum threshold, but the pre-FEC BER is greater than the prior maximum threshold, then the DQI score is the middle rating, i.e. 3, if not then the original logic box 84 is considered; however, if the pre-FEC BER is also equal to or greater than the prior minimum threshold, e.g. $1 \times e^{-8}$, then the DQI score is between the middle and highest ratings, i.e. 4, and if not, i.e. the post-FEC BER is less than the post minimum threshold and the pre-FEC BER is less that the prior minimum threshold, then the DQI score is the highest rating, i.e. 5.

Figure 11:
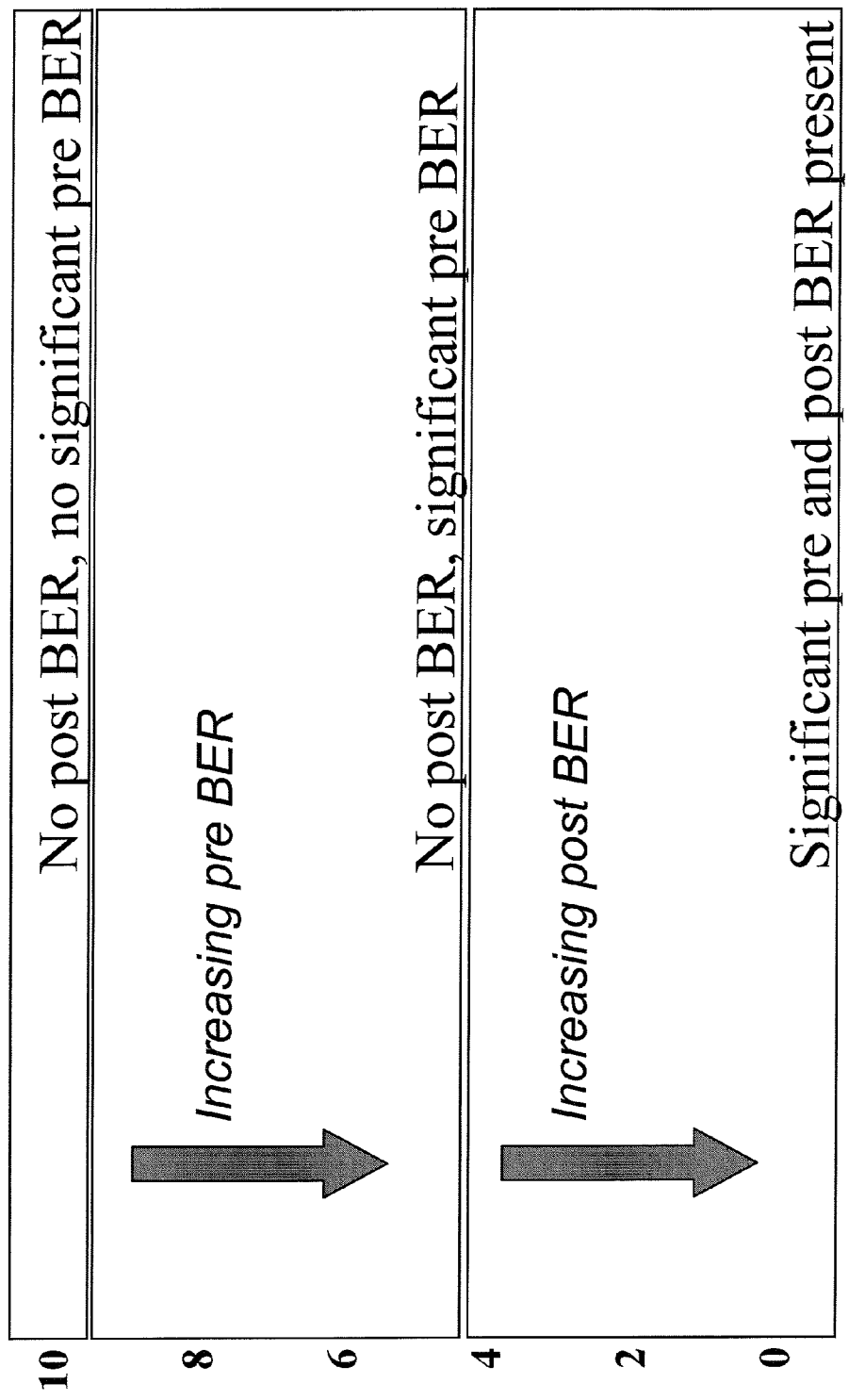
FIG. 11 is a chart representative of the DQI in relation to BER prior to and after the FEC.

In the scoring subsystem 3 BER averages are read from the measurement subsystem 2 and scored at a rate of 1 to 2 updates per second. FIG. 11 illustrates the general relationship between pre-FEC BER, post-FEC BER and the DQI score, i.e. if there is no post-FEC BER and no significant pre-FEC BER, then the DQI score would be approximately the highest rating, e.g. 10. As the pre-FEC BER increases, while the post-FEC BER remains consistently low, the DQI score ranges from near the highest to the middle rating, e.g. 9 down to 5. As the amount of post-FEC BER also increases, the DQI score decreases from the middle rating down to the lowest rating, e.g. 5 to 0, at which point, significant amounts of both pre-FEC BER and post-FEC BER are found.

Figure 12:
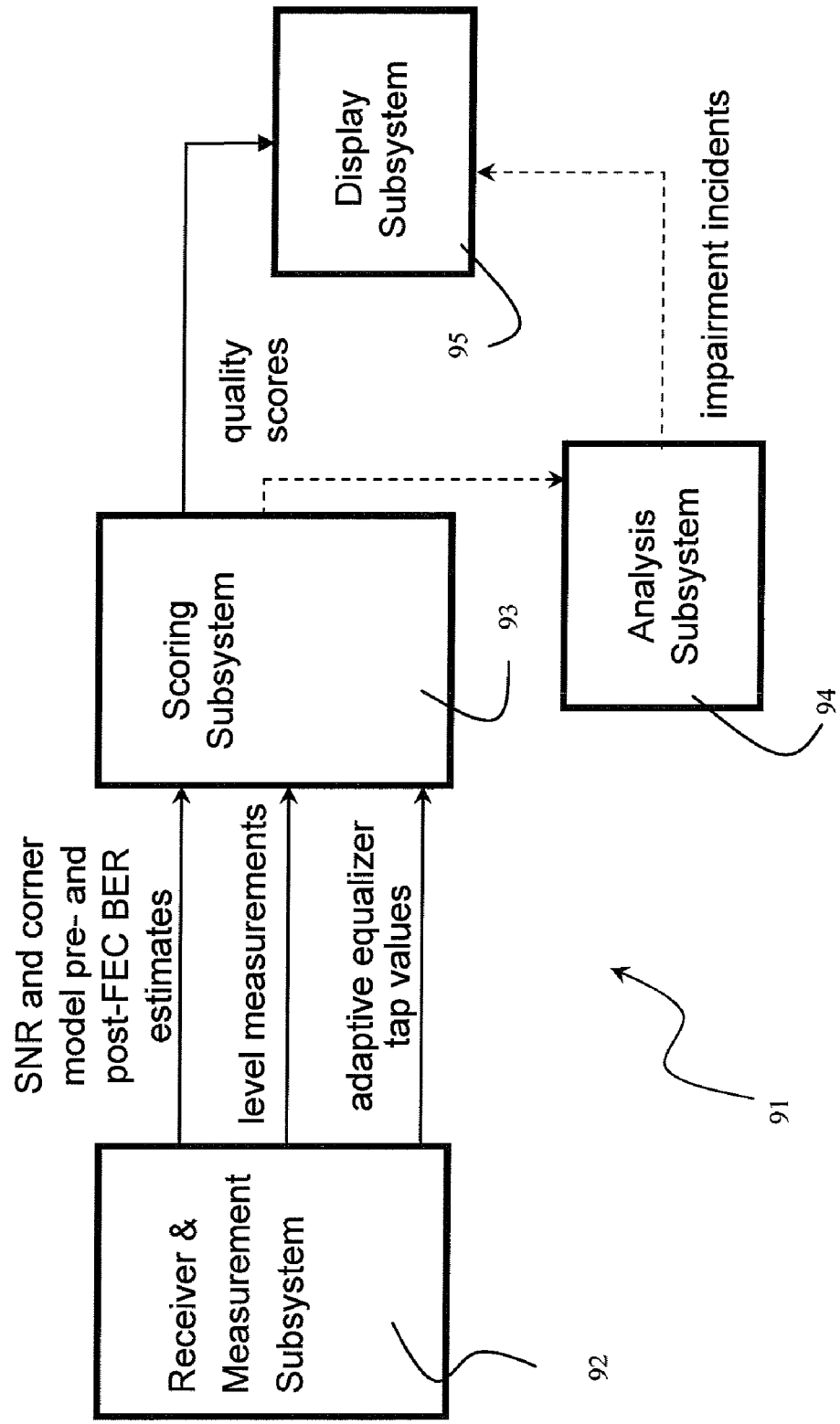
FIG. 12 is an alternative flow chart for determining an enhanced DQI in accordance with level measurements and adaptive equalizer tap values.

With reference to FIG. 12, an enhanced DQI system 91 enables a DQI receiver and measurement system 92 to evaluate certain adverse network conditions that do not impair the QAM receiver 92, but could adversely affect consumer-grade receivers. Typically, these adverse network conditions do not affect the pre- and post-BER values coming from the receiver and measurement subsystem 92; however, the scoring subsystem 93 can be enhanced in order to use the information provided by the enhancements.

The signal level of the digital channel being tested may fluctuate when amplifiers in the network experience problems with their automatic gain control (AGC) circuitry. The degree of signal impairment varies with the amount and rate of the fluctuations. The signal level may also vary at a rate corresponding to the frequency of the AC power supply driving an amplifier, or in some cases, twice the AC power supply frequency. These variations, commonly called hum, may also introduce impairments in consumer-grade digital receivers.

The DQI scoring subsystem 93 estimates the effects of amplitude fluctuation caused by the AGC circuitry or hum and the effects of linear distortions by quantifying the degree to which each impairment is present, and adjusts, e.g. reduces, the overall DQI score by weighting factors or other means of combining the results. With these enhancements, the scoring subsystem 93 outputs individual scores for each type of impairment as well as a composite score representing overall quality.

In the enhanced receiver and measurement subsystem 92, the QAM demodulator 12 (see FIG. 2) includes an adaptive equalizer component that reduces the effects of micro-reflections, group delay variations, frequency response variations, and other linear distortions of the received QAM digital signal. The adaptive equalizer contains a number of feed-forward equalization (FFE) and decision feedback equalization (DFE) taps. Each tap has an associated complex coefficient value. The demodulator 12 continually adjusts the tap values using the error information provided by each symbol decode. A typical receiver has 16 FFE and 24 DFE taps.

The receiver and measurement subsystem 92 periodically captures and outputs the instantaneous values of the tap coefficients. The tap values are updated at the same rate as the receiver and measurement subsystem 92 provides pre- and post-FEC BER values to the scoring subsystem 93.

A typical decoder chip in the equalizer enables the tap values to be read one at a time. The measurement subsystem 92 captures a complete set of the tap coefficient values representing the overall equalizer state at a point in time, by first: stopping the automatic updating of the tap values; and then by reading the values from the decoder chip sequentially. After all values are read, normal updating of the equalizer continues.

One advantage of DQI over other digital measurements is its ability to show impairments as a slight lowering of the DQI score, which would otherwise be too small to show up in a pre-FEC BER test or disrupt subscriber services. In particular, the DQI score is lowered by equalizer tap values with magnitudes that are within range, but are close to thresholds at which the equalizer would be unable to adapt.

For yet another enhancement, the receiver and measurement subsystem 92 performs signal level measurements in order to report conditions that can adversely affect the performance of consumer-grade digital receivers, but do not affect the receiver used in the DQI device 91. In order to measure signal level fluctuations, the measurement subsystem 92 determines the signal level several times during a display update period. The measurement rate must be at least four times the AC power supply frequency in order to detect and quantify hum. The signal level measurement may use any of the following means:

a) The measurement subsystem 92 reads the instantaneous gain setting of an AGC system found in the QAM decoder chip therein to determine the signal level. A lower gain indicates a higher received signal level.

b) One of the FFE taps of the adaptive equalizer is configured to be the main tap, with an imaginary value fixed at zero, whereby the mechanism used to update the tap values is adapted, so that the real value of the main tap represents the received signal level. A lower tap value indicates a higher received signal level.

c) Additional circuitry is included in the measurement subsystem 92 to measure the received signal level without disrupting the QAM decoder.

If the level measurements are performed at a fast enough rate to measure hum, the measurement subsystem 92 outputs separate values for signal level stability and for hum. In order to differentiate between them, the measurement subsystem 92 may use either filtering or a Fourier transform to identify fluctuations occurring at the AC power supply frequency or a multiple thereof.

The cable network carries additional channels with the channel under test, e.g. both analog and digital TV channels, and an ideal QAM receiver will block the additional channels, otherwise the other channels will produce inter-modulation distortions within the receiver circuitry. The amount of distortion depends on the relative level of the signal under test compared to the power levels of other signals present. If the receiver can attenuate all incoming signals in order to bring the level of the measured channel down to an acceptable level, inter-modulation distortion will be reduced.

The measurement system 92 may use any of the following methods alone or in combinations to determine the relative level of the digital channel under test:

i) tune to each channel, measure the power, and sum the results to compute the total integrated power.

ii) measure the levels of the analog TV channels present and use the highest level as a reference. Channels at lower frequencies generally have higher levels, so only those analog TV channels up to a cutoff frequency are measured.

ii) determine a tilt line based on the levels of the analog TV channels, and measure the difference in level between the digital channel under test and the height of the tilt line at the center frequency of the digital channel.

If a separate tuner is used to measure the additional channels, the measurement subsystem 92 can update the reference level periodically. If the additional channels are measured using the same tuner 11 that the QAM receiver and measurement subsystem 92 uses, the measurement subsystem 92 takes an initial reading of the additional channels before tuning to the digital channel and commencing periodic DQI measurements. DQI updates are then suspended, and the measurements of the additional channels are repeated, if the level of the measured channel changes significantly. DQI updates may also suspend, while the additional channels are measured at some predetermined calibration interval.

Pre-FEC BER values are being updated every 5 to 50 (or 10 to 25) microseconds. In addition to averaging these values every 0.5 to 2 seconds, specific frequency components can be observed by performing a Fourier transform or by using filters.

Separate outputs can be used to measure degradation caused by two specific impairments: a component occurring at the AC power supply frequency or a multiple of it can be used to indicate the presence of hum; if the sampling rate is made fast enough, e.g. 30 microseconds or less, a frequency component of 15.75 kHz can be used to indicate the presence of composite second order (CSO) or composite triple beat (CTB) impairments.

The analysis subsystem 4 identifies times of low signal quality by time of occurrence, duration and severity. Low scores occurring within a short time period can be combined into a single impairment incident, and a weighted average can be used to represent the single impairment incident. A concise summary of significant results, e.g. high DQI score, low DQI score, average DQI score, weighted average DQI score, can be determined by the analysis subsystem 4, when DQI measurements are acquired over a long time period.

With the aforementioned enhancements, the SNR-corner combiners may be moved from the measurement subsystem 92 to the scoring subsystem 93, which enables the scoring subsystem 93 to output separate scores from each model or analyzer, as well as include their effects in the composite score. Separate scores can be output for specific impairment types:

| DQI Component Score | Supporting Measurement |
|---|---|
| Thermal noise | SNR analyzer, continuously low values |
| Impulse noise | SNR analyzer, occasional low values |
| CSO and CTB | SNR analyzer, 15.75 kHz frequency component |
| Phase noise | I-Q Corner model |
| Hum | Level fluctuations at multiples of the AC power supply frequency; SNR analyzer, components at these frequencies. |
| Signal level instability | Other level fluctuations, such as caused by amplifier AGC problems |
| Linear distortions | Equalizer tap values |
| Intermodulation | Digital channel level too low relative to the reference level |

With the enhancements, the scoring subsystem 92 may model the performance of consumer-grade QAM receivers, and use a single model, or different parameters to model the effects of specific types or makes of receivers. The parameters that could vary with the receiver type may include but are not limited to the following:

1) The amount of variation in the input signal level that is acceptable. 2) The rate of change of the input signal level that is acceptable. 3) The percent hum that is acceptable. 4) The number of FFE and DFE taps being used in the adaptive equalizer. 5) The equalizer adaptation algorithms and parameters. 6) The sensitivity of the receiver to inter-modulation distortions. 7) The AGC bandwidth. 8) The derotator bandwidth. 9) The characteristics of any bandpass or notch filter components that may be present.

The analysis subsystem 94 can track specific types of impairments using the component DQI scores, i.e. log the time of occurrence of impairments by impairment type as well as by severity and duration.

In the display subsystem 5, the DQI signal quality scores are reported numerically at readout 91, e.g. updated every 0.5 to 2 seconds, and graphically over time at display readout 92. If a specific impairment exists in the network under test, the graphical display 92 will capture a signature of the impairment. However less than 0.5 seconds and greater than 2 seconds is also possible if faster hardware is available or a slower transition is desirable. The lowest and highest DQI scores can also be displayed for a test run over a desired time period. A marker can be included in the display subsystem 95, whereby the individual component scores at the marker position can be displayed numerically. Alternatively, the impairment type receiving the lowest component score can be displayed textually. The marker can be moved a single point at a time with individual inputs, e.g. touch pad or keyboard 26, or it can be made to jump from one low point in the history to another. The display subsystems 5 and 95 can also show the status and results of other measurements occurring concurrently, e.g. signal level, MER, QAM lock status, and Interleaver depth. A written indication of how the system performed, e.g. pass/fail, excellent/good/fair/poor/no-signal, no-impairments/slight/moderate/severe, can also be displayed. The impairment incidents can be listed in order of occurrence or severity, along with their time and duration.

The DQI system provides more measurable data points than conventional BER systems, and responds faster to changing conditions. Impairments are reported before bit errors actually occur, without having to fully decode the incoming signals.

We claim:

1. A method of determining an indication of the quality on a quadrature amplitude modulated (QAM) digital signal on a cable network with forward error correction comprising the steps of:
   a) determining a first bit error rate (BER) of the digital signal prior to forward error correction (FEC);
   b) determining a second bit error rate after forward error correction (FEC);
   c) determining a digital quality index (DQI) on a predetermined scale based on the first and second bit error rates; and
   d) displaying the DQI to provide an indication of the quality of the QAM digital signal on the cable network.

2. The method according to claim 1, wherein step a) comprises:
   determining an error voltage $V_{ERR}$ of the digital signal; and
   determining the first bit error rate based on a predetermined statistical relationship between the $V_{ERR}$ and the first BER.

3. The method according to claim 2, wherein the first bit error rate f(x) is computed from a scaled $V_{ERR}$ value x using a modified exponential equation $$f(x) = \frac{c}{1 + ae^{-bx}}$$

wherein a>0, b>0 and 0≦c≦1 and based on decoding hardware.

4. The method according to claim 2, wherein step b) comprises determining the second bit error rate based on a predetermined statistical relationship between the first BER and the second BER.

5. The method according to claim 4, wherein the second BER g(x) is computed from the first BER x using the equation $$g(x) = xe^{-p/x^q}$$

wherein p and q>0, and based on decoding hardware.

6. The method according to claim 4, wherein the FEC includes interleaving bits in the digital signal utilizing an interleaver;

wherein M equals a sample burst correction time divided by a sample period, and N equals interleaver latency time divided by the sample period; and wherein step b) includes taking an average of a lowest M values of a most recent N values of the second BER;

whereby burst protection effects of interleaving are approximated.

7. The method according to claim 4, wherein the second BER is also determined based on a predetermined statistical relationship between the first BER and the second BER;
   wherein $$q(p) = pe^{\frac{k}{mp^r}}$$

wherein p is the first BER estimate, q is the second BER estimate, and k, m, and r are based on decoding hardware.

8. The method according to claim 2, wherein step a) also comprises:
   determining a corner average error metric of the digital signal; and
   determining the first bit error rate based on a predetermined statistical relationship between the corner average error metric and the first BER.

9. The method according to claim 8, wherein $p(x) = ax^b$
   wherein x is the corner average error metric, p is the pre-FEC BER estimate, and a and b are based on decoding hardware.

10. The method according to claim 2, further comprising determining the second bit error rate after FEC based on a predetermined statistical relationship between the first BER and the second BER;

wherein the FEC includes interleaving bits in the digital signal utilizing an interleaver;

wherein M equals a sample burst correction time divided by a sample period, and N equals interleaver latency time divided by the sample period; and wherein step b) includes taking an average of a lowest M values of a most recent N values of the second BER;

whereby burst protection effects of interleaving are approximated.

11. The method according to claim 1, wherein step c) includes:
   i) determining whether post-FEC BER is equal to or greater than a post minimum threshold;
      if the post-FEC BER is equal to or greater than the post minimum threshold, then determining whether the post-FEC BER is equal to or greater than a post maximum threshold, whereby if so, then the DQI score is determined to be a lowest rating on the predetermined scale;
      if the post-FEC BER is not equal to or greater than the post maximum threshold, then determining whether the post-FEC BER is between the post minimum and post maximum thresholds, whereby if so, then the DQI score varies between a minimum rating and a middle rating; and
   ii) if the post-FEC BER is not equal to or greater than a post minimum threshold:
      determining whether pre-FEC BER is equal to or greater than a prior maximum threshold, whereby if so then the DQI score is the middle rating on the predetermined scale;

if the pre-FEC BER is not equal to or greater than an prior maximum threshold, then determining whether the pre-FEC BER is between the prior minimum and prior maximum thresholds, whereby if so then the DQI score varies between the middle rating and the maximum rating on the predetermined scale; whereby if the pre-FEC BER is less than the prior minimum threshold, then the DQI score is a highest rating on the predetermined scale.

12. The method according to claim 11, wherein the post minimum threshold is approximately $1 \times e^{-8}$, and the post maximum threshold is approximately $1 \times e^{-4}$, whereby if the post-FEC BER is between the post minimum and post maximum thresholds the DQI score equals int(−12.5 log(second BER)−50)/10; and wherein the prior maximum value is approximately $1 \times e^{-4}$, and the prior minimum value is approximately $1 \times e^{-8}$, whereby if the pre-FEC BER is between the prior minimum and prior maximum values, the DQI score is int(−12.5 log(first BER)/10.

13. The method according to claim 11, wherein the post minimum threshold is approximately $1 \times e^{-8}$, and the post maximum threshold is approximately $1 \times e^{-4}$, whereby if the post-FEC BER is between the post minimum and post maximum thresholds the DQI score equals int(−12.5 log(second BER)−50)/10; and wherein the prior maximum value is approximately $1 \times e^{-4}$, and the prior minimum value is approximately $1 \times e^{-9}$, whereby if the pre-FEC BER is between the prior minimum and prior maximum values, the DQI score is int(−10 log(first BER)+10)/10.

14. The method according to claim 11, wherein the post minimum threshold is approximately $1 \times e^{-8}$, and the post maximum threshold is approximately $1 \times e^{-6}$, whereby if the post-FEC BER is between the post minimum and post maximum thresholds the DQI score is between the lowest and middle ratings; and wherein the prior maximum value is approximately $1 \times e^{-6}$, and the prior minimum value is approximately $1 \times e^{-8}$, whereby if the pre-FEC BER is between the prior minimum and prior maximum values, the DQI score is between the middle and highest ratings.

15. The method according to claim 1, wherein step d) includes displaying a plurality of DQI over time on a graph.

16. A testing device for generating an indication of the quality on a quadrature amplitude modulated (QAM) digital signal on a cable network with forward error correction (FEC) comprising:
an input port for receiving the QAM digital signal;
first bit error rate (BER) generating means for determining the BER of the QAM digital signal prior to FEC;
second first bit error rate (BER) generating means for determining the BER of the QAM digital signal after FEC;
digital quality index generating means for determining a digital quality index (DQI) of the QAM digital signal on a predetermined scale based on the first and second BER; and
a display for displaying the DQI to provide an indication of the quality of the QAM digital signal on the cable network.

17. The testing device according to claim 16, wherein the first BER generating means includes a voltage error ($V_{ERR}$) generator, and first logic means for determining the first bit error rate based on a predetermined statistical relationship between the $V_{ERR}$ and the first BER.

18. The testing device according to claim 17, wherein the first BER f(x) is computed from a scaled $V_{ERR}$ value x using a modified exponential equation $$f(x) = \frac{c}{1 + ae^{-bx}}$$

wherein a>0, b>0 and $0 \leq c \leq 1$ and based on first bit error rate generating means.

19. The testing device according to claim 17, wherein the second BER generating means includes second logic means for determining the second bit error rate based on a predetermined statistical relationship between the first BER and the second BER.

20. The testing device according to claim 19, wherein the second BER g(x) is computed from the first BER x using the equation $$g(x) = xe^{-p/x^q}$$

wherein p and q>0, and based on the first BER generating means.

21. The testing device according to claim 19, wherein the FEC includes interleaving bits in the digital signal utilizing an interleaver;
wherein the second BER generating means includes taking an average of a lowest M values of a most recent N values of the second BER;
wherein M equals a sample burst correction time divided by a sample period, and N equals interleaver latency time divided by the sample period;
whereby burst protection effects of interleaving are approximated.

22. The testing device according to claim 17, wherein the first BER generating means also includes a corner average metric generating means for determining a corner average error metric of the digital signal; and
wherein the digital quality index generating means determines the first bit error rate based also on a predetermined statistical relationship between the corner average error metric and the first BER.

23. The testing device according to claim 17, wherein the voltage error ($V_{ERR}$) generator comprises a QAM demodulator, which includes an equalizer containing a plurality of feed-forward equalization (FFE) and decision feedback equalization (DFE) taps indicative of impairments to the network; whereby the digital quality index generating means adjusts the DQI based on the plurality of feed-forward equalization (FFE) and decision feedback equalization (DFE) taps.

24. The testing device according to claim 16, further comprising signal level measuring means for measuring a power level of the QAM digital signal, whereby the digital quality index generating means adjusts the DQI based on the measured signal level.

25. A method of determining a bit error rate of a quadrature amplitude modulated (QAM) digital signal on a cable network with forward error correction (FEC) comprising the steps of:
a) determining an error voltage $V_{ERR}$ of the digital signal once every 5 to 50 microseconds;
b) determining a first bit error rate prior to FEC based on a predetermined statistical relationship between the $V_{ERR}$ and the first BER once every 5 to 50 microseconds; and
c) averaging the first BER every 0.5 to 2 seconds.

* * * * *